US008793668B2

United States Patent
Gutha et al.

(10) Patent No.: US 8,793,668 B2
(45) Date of Patent: Jul. 29, 2014

(54) PROTOCOL INDEPENDENT PROGRAMMING ENVIRONMENT

(75) Inventors: Stalin Gutha, Bangalore (IN); Janaki Krishnaswamy, Bangalore (IN); Lavanya Bhadriraju, Bangalore (IN); Ankur Jhawar, Bangalore (IN); Kevin B. Moore, Chaska, MN (US); Subramanya Nagaraj, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1038 days.

(21) Appl. No.: 12/650,467

(22) Filed: Dec. 30, 2009

(65) Prior Publication Data
US 2011/0161992 A1   Jun. 30, 2011

(51) Int. Cl.
*G06F 9/45* (2006.01)
*G06F 15/16* (2006.01)

(52) U.S. Cl.
USPC .......................................... 717/140; 709/230

(58) Field of Classification Search
None
See application file for complete search history.

(56) References Cited

U.S. PATENT DOCUMENTS

| 7,586,899 | B1 * | 9/2009 | Mohaban et al. | 370/352 |
|---|---|---|---|---|
| 2002/0196285 | A1 * | 12/2002 | Sojoodi et al. | 345/771 |
| 2003/0001896 | A1 * | 1/2003 | Johnson et al. | 345/771 |
| 2005/0230490 | A1 | 10/2005 | Pouchak et al. | |
| 2008/0004754 | A1 | 1/2008 | Pouchak et al. | |
| 2008/0010049 | A1 | 1/2008 | Pouchak et al. | |
| 2008/0015739 | A1 | 1/2008 | Wacker | |
| 2008/0016493 | A1 | 1/2008 | Pouchak et al. | |
| 2008/0115153 | A1 | 5/2008 | Brindle | |
| 2008/0125914 | A1 | 5/2008 | Wacker | |
| 2008/0281472 | A1 * | 11/2008 | Podgorny et al. | 700/276 |
| 2009/0113037 | A1 | 4/2009 | Pouchak | |
| 2010/0100583 | A1 | 4/2010 | Pouchak | |

OTHER PUBLICATIONS

Honeywell Spyder Bacnet User's Guide, 242 pages, Revised Jul. 2009.
Honeywell Spyder User's Guide 202 pages, Released Jul. 2007.
Siemens, BACnet for DESIGO 27 pages, prior to Dec. 30, 2009.

* cited by examiner

*Primary Examiner* — Hyun Nam
(74) *Attorney, Agent, or Firm* — Seager, Tufte, Wickhem LLC (57) ABSTRACT

A protocol independent programming tool for constructing control logic. The control logic may be constructed without dealing in the details of an underlying protocol. The protocol details may be abstracted and exposed and generic points used in constructing the logic. The tool may automatically map or translate the points used in the logic to protocol specific entities.

20 Claims, 7 Drawing Sheets

PROTOCOL INDEPENDENT PROGRAMMING ENVIRONMENT

RELATED APPLICATIONS

Related co-pending applications include application Ser. No. 12/650,385, filed Dec. 30, 2009, entitled "A Graphical Approach to Setup Data Sharing between Two Controllers"; application Ser. No. 12/650,447, filed Dec. 30, 2009, entitled "A Mechanism for Constructing Generic Control Logic including Versions in Various Protocols"; application Ser. No. 12/650,476, filed Dec. 30, 2009, entitled "Priority Selection Mechanism for Driving Outputs from Control Logic for Controllers of Various Protocols"; application Ser. No. 12/650,485, filed Dec. 30, 2009, entitled "An Approach to Automatically Encode Application Enumeration Values to Enable Reuse of Applications across Various Controllers"; application Ser. No. 12/650,497, filed Dec. 30, 2009, entitled "An Approach for Switching between Point Types without Affecting Control Logic"; and application Ser. No. 12/650,513, filed Dec. 30, 2009, entitled "Changeable BACnet Interface".

Related co-pending applications include application Ser. No. 12/650,385, filed Dec. 30, 2009, entitled "A Graphical Approach to Setup Data Sharing between Two Controllers", is hereby incorporated by reference. Application Ser. No. 12/650,447, filed Dec. 30, 2009, entitled "A Mechanism for Constructing Generic Control Logic including Versions in Various Protocols", is hereby incorporated by reference. Application Ser. No. 12/650,476, filed Dec. 30, 2009, entitled "Priority Selection Mechanism for Driving Outputs from Control Logic for Controllers of Various Protocols", is hereby incorporated by reference. Application Ser. No. 12/650,485, filed Dec. 30, 2009, entitled "An Approach to Automatically Encode Application Enumeration Values to Enable Reuse of Applications across Various Controllers", is hereby incorporated by reference. Application Ser. No. 12/650,497, filed Dec. 30, 2009, entitled "An Approach for Switching between Point Types without Affecting Control Logic", is hereby incorporated by reference. Application Ser. No. 12/650,513, filed Dec. 30, 2009, entitled "Changeable BACnet Interface", is hereby incorporated by reference.

BACKGROUND

The invention pertains to programming and particularly to various programming environments. More particularly, the invention pertains to heating, ventilation and air conditioning environments.

SUMMARY

The invention provides a protocol independent programming environment for heating, ventilation and air conditioning controllers. This environment may increase productivity of control engineers and reduce their learning curve.

DESCRIPTION

Tools used for programming heating, ventilation and air conditioning (HVAC) controllers may expose intricate details of an underlying protocol to the engineers using the tools. These tools are often designed with an expectation that the users are to be protocol experts apart from being application and/or direct digital control experts. This expectation may make it very difficult for experienced or novice users to use the tools and deploy direct digital control (DDC) systems.

The present approach is a generic tool that may abstract the protocol details and expose them as generic points that can be used while creating DDC logic. An application engineer does not necessarily need to worry about protocol nuances and thus can focus on a core domain of expertise. The tool may automatically map or translate points used in the logic to protocol specific entities. A control engineer may focus on application development rather than be concerned about protocol details. This narrowing of the engineer's responsibility should improve productivity.

A Spyder™ (Spyder) programming tool may be modified to hide details of the BACnet (Bacnet) protocol from the application programmer and only expose the minimal set of information required for programming. The application programmer may create the control logic by using generic points that are automatically mapped or translated to BACnet objects in the tool. Spyder™ is a trademark of Honeywell International Inc. BACnet is a communications protocol for building automation and control networks.

A NiagaraAX™ (NiagaraAX or Niagara) software platform may use a generic Network-Device-Point model to represent information from a device irrespective of the communication protocol used. The Spyder programming tool may take advantage of this model and extend it to create a programming environment that hides protocol specific items (for example, LonTalk™ (Lon™ Lon, LonTalk) network variables and BACnet objects) from an application programmer's view. NiagaraAX™ and Niagara™ (Niagara) are trademarks of Tridium, Inc. LonTalk™ and Lon™ are trademarks of Echelon Corp.

The programming tool for the BACnet Spyder controller utilized to program the DDC control logic may be used along with the Lon Spyder offering. A scope of the tool development may include adding a BACnet layer to the existing Spyder tool while ensuring that the BACnet programming tool works seamlessly with the Lon programming tool.

A challenge may be to keep the communication protocol details hidden from the user and abstract them so that existing users of the LonTalk based system are not necessarily overwhelmed by the nuances of a BACnet protocol. The present approach may utilize mechanisms to normalize LonTalk and BACnet mechanisms and to expose an abstract representation so that DDC engineers can program the controllers even without being familiar with LonTalk or BACnet protocols.

Spyder is the trademark of a range of HVAC controllers. There may be different models of these controllers that are designed for communication either using LonTalk or BACnet protocol. The software tool used to program these controllers may be used by HVAC contractors who are often low-skilled individuals who are not necessarily experts in communication protocols. This factor forces a requirement that the software tool should be extremely simple and should not expose communication protocol complexities to the users.

A data point abstraction may be noted. LonTalk network variables and BACnet objects may be hidden from the user. The tool may merely expose "Data Points" to the user. The data points may represent logical application level values like space temperature, damper position, and the like. The tool may automatically map data points to the protocol entities like LonTalk NV's (network variables) or BACnet objects without user intervention. The user may program virtually all of the logical data points in the system without being concerned about how they translate into protocol entities.

Figure 1A:
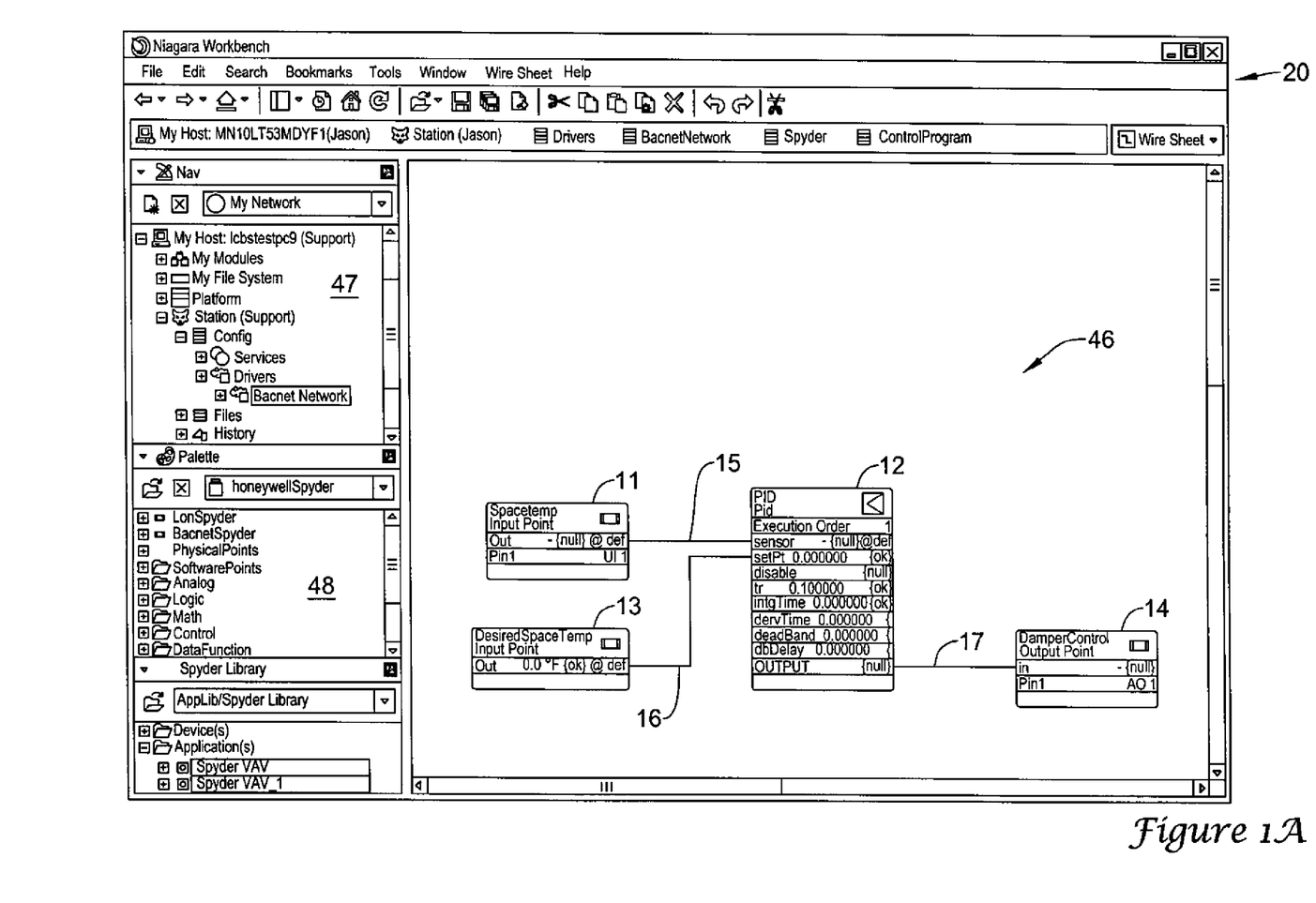
FIG. 1a is a diagram of a workbench with an illustrative example of a data point incorporated in a control logic layout.
Figure 1B:
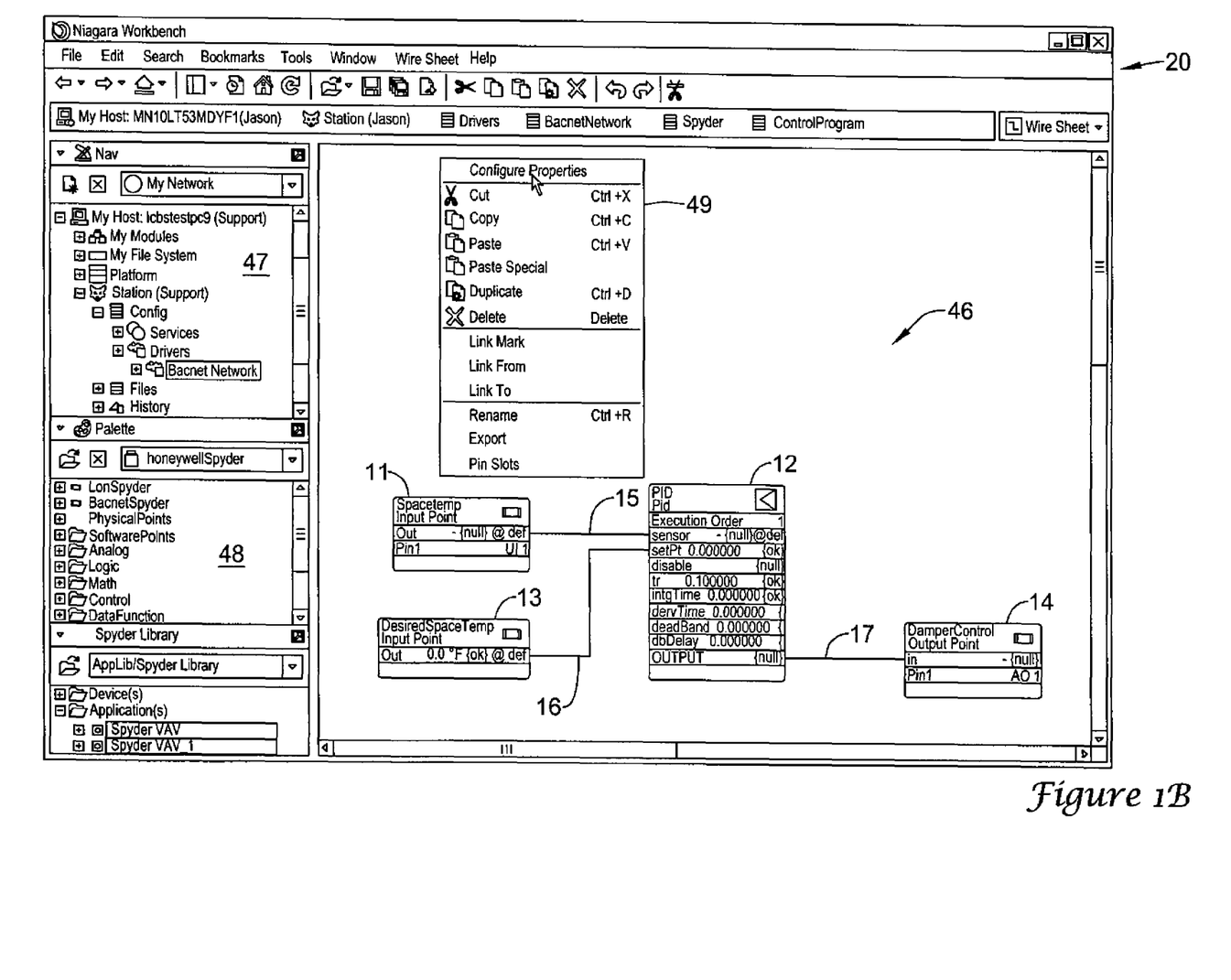
FIG. 1b is a diagram of dialog box invoked for accessing configuration properties of a data point.

FIG. 1a is a diagram of a workbench 20 where control logic 46 may be constructed with a drag and drop of items from a palette 48 on to a wiresheet in the workbench. The workbench may be a Niagara workbench. FIG. 1a shows an illustrative example of a data point incorporated in the control logic layout. FIG. 1b is a diagram of a dialog box 49 invoked for accessing configuration properties of a data point by clicking on the point. An illustrative example of the data point may be a space temperature data point 11 used in control logic 46.

FIGS. 1a and 1b indicate how an installer may program a controller using abstract, logical entities such as space temperature. A space temperature input point 11 may be connected to a damper proportional or predictive, integral and derivative control (PID) function block 12 with a link 15. A desired space temperature input point 13 may be connected to an input of block 12 with a link 16. An output of block 12 may be connected to a damper control output point 14 with a link 17.

Figure 2:
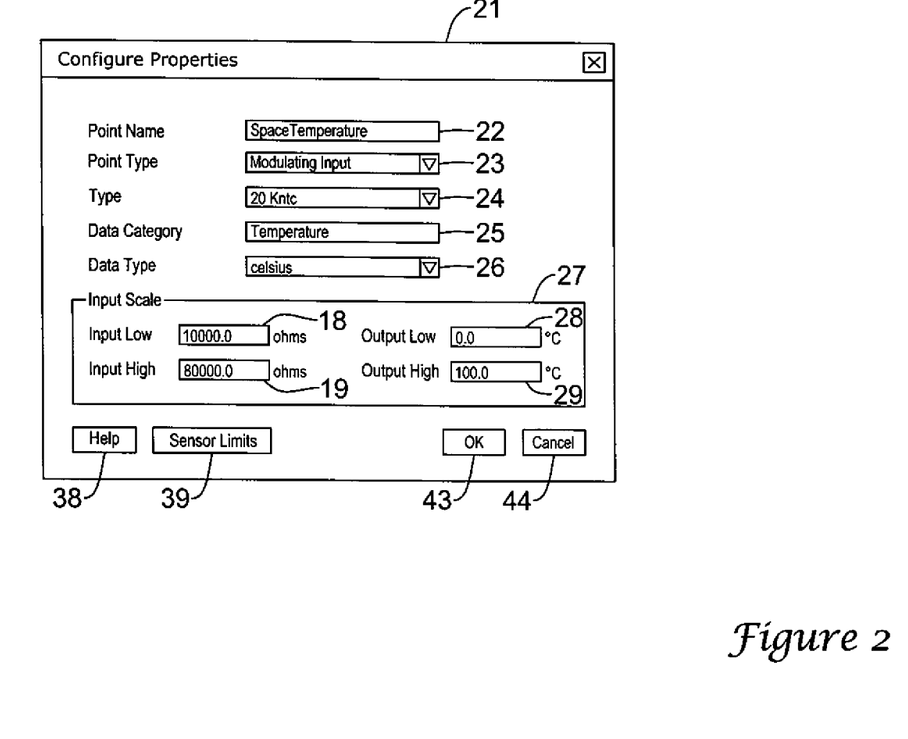
FIG. 2 is a diagram of a dialog box showing some of the logical properties of the data point.

FIG. 2 is a diagram of a dialog box 21 that shows some of the configure properties of the "Space Temperature" data point. The properties may include point name 22, point type 23, type 24, data category 25, data type 26 and input state 27. Input state 27 may include input low 18 and input high 19 in terms of ohms, and output low 28 and output high 29 in terms of ° C. Buttons on the dialog box 21 may have labels "Help", "Sensor Limits", "OK" and "Cancel".

There may be various logical steps for an HVAV programmer which do not require that the installer know anything about BACnet or LonTalk. As the user is creating and defining and configuring these data points, the tool may automatically create and map these data points to the LonTalk protocol entity, in this case an NVI (network variable input) named "nviSpaceTemp".

Figure 3:
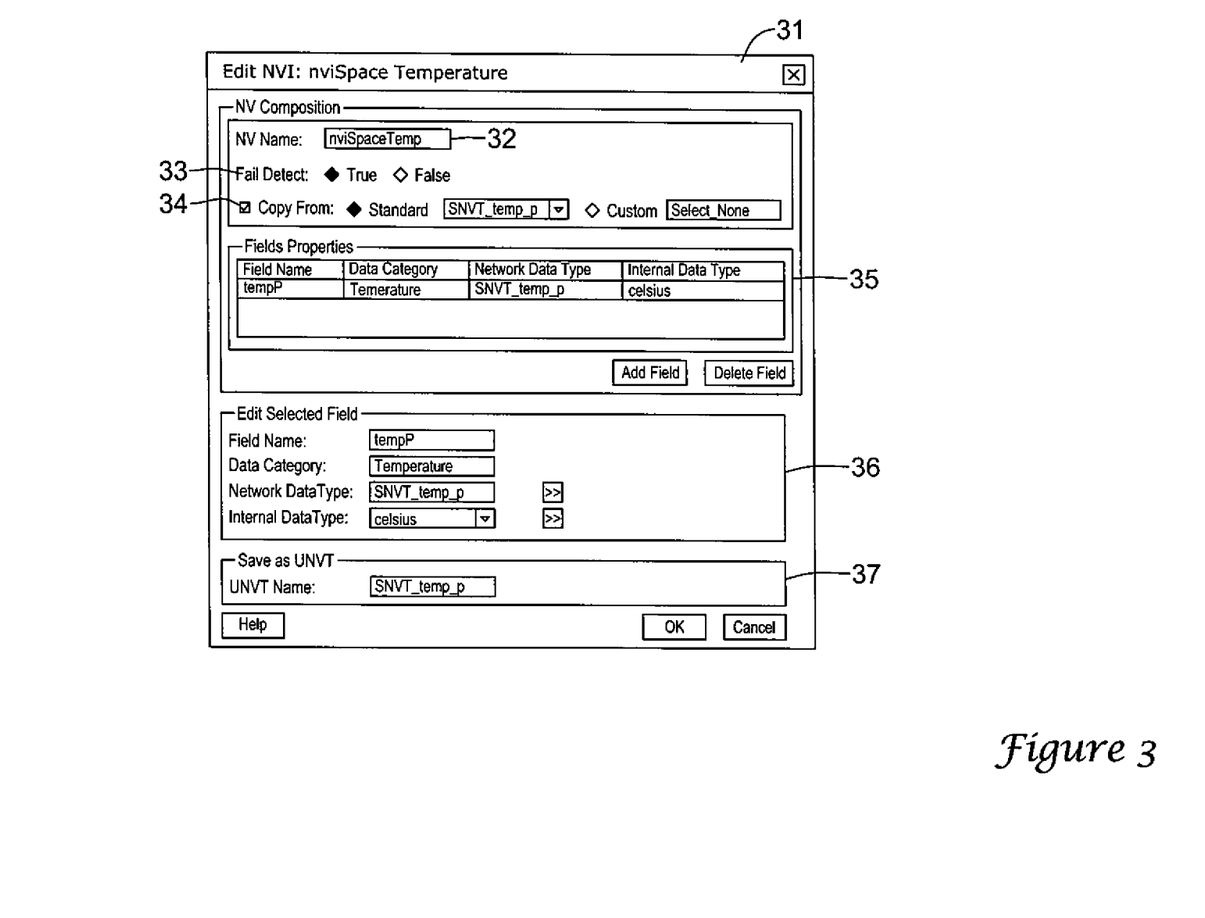
FIG. 3 is a diagram of a dialog box showing properties of an illustrative example of an auto-generated network variable input which may be edited.

FIG. 3 shows the properties of an auto-generated LonTalk network variable input. The Figure is a diagram of a dialog box 31 for editing an NVI, which in the present box is "nviSpaceTemp". The NV (network variable) composition may include NV name 32, fail detect indication 33, copy from standard or custom selection 34, field properties 35 which indicate field name, data category, network data type, and internal data type. A field may be added or deleted. There may be an edit field block 36 where field name, data category, network data type and internal data type may be edited. There may be a "Save as UNVT" block 37 with a space for a UNVT name which in the specific case of FIG. 3 is "SNVT_temp_p". SNVT may be regarded as a standard network variable type. UNVT may be regarded as a user network variable type.

Figure 4:
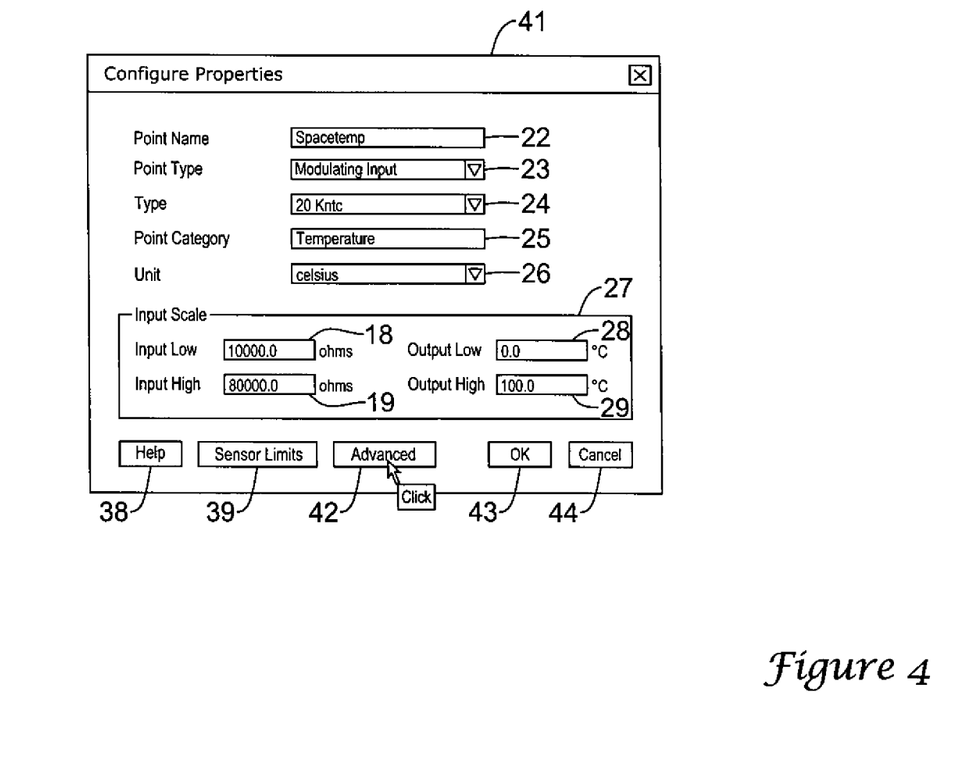
FIG. 4 is a diagram of a dialog box for configuring properties, which is similar to the box in FIG. 2 except that it has an advanced button.
Figure 5:
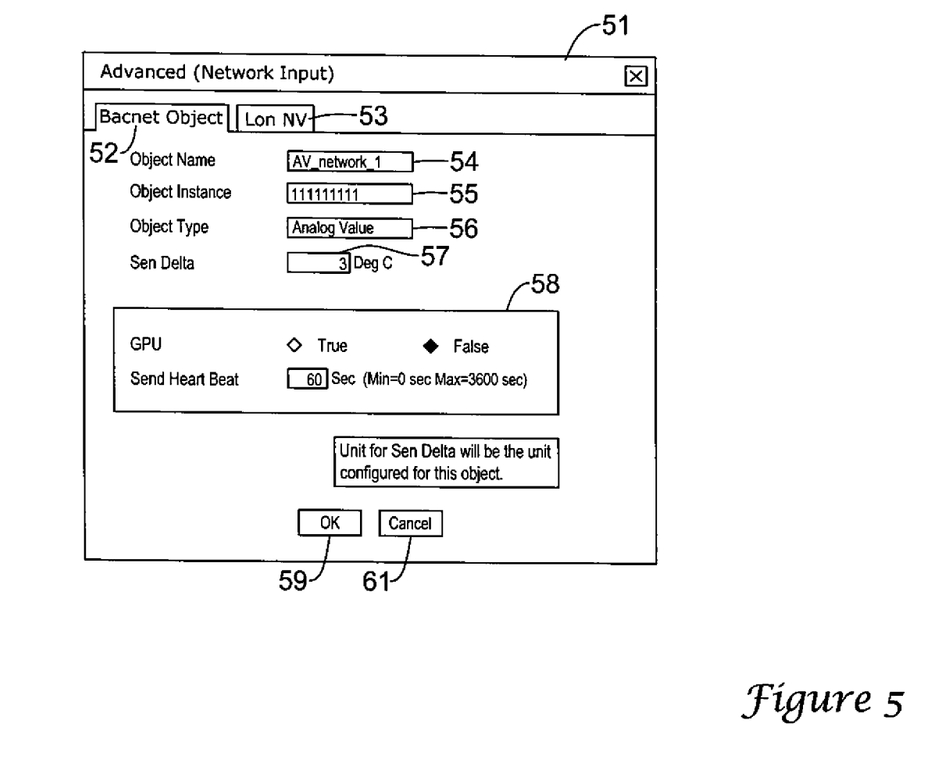
FIG. 5 is a diagram of a screen which may result from a click on the advanced button in the box of FIG. 4, and may be used relative to mapping details of a protocol for a data point object.

FIG. 4 reveals a dialog box 41 for "Configure Properties", which is similar to box 21 of FIG. 2 except it has an "Advanced" button 42 to be clicked on. The properties of a data point and how they are mapped both to a LonTalk NV are shown in FIG. 4 as well as properties of a BACnet object in an advanced screen 51 as shown in FIG. 5. In other words, these shown a mapping of both LonTalk and BACnet details to a data point object.

Advanced network input screen 51 has tabs or buttons 52 and 53 for selection of "BACnet Object" or a "Lon NV", respectively. Other protocols may be represented with additional or other tabs or buttons on screen 51. In FIG. 5, a BACnet object appears as selected. There may be an object name 54 (e.g., AV_network_1), object instance 55 (e.g., 111111111), and object type 56 (e.g., Analog Value), and a sen delta 57 of deg C. (e.g., 3). The unit for sen delta may be the unit configured for this object. There may be a GPU (guaranteed periodic update) box 58 with a true and false selection and a send heart beat (e.g., 60 sec with min=0 and max=3600). If the entries are acceptable, then the OK button 59 may be clicked or if not, then the cancel button 61 may be clicked. Some of the Figures may relate to VAV (variable air volume) aspects.

Figure 6:
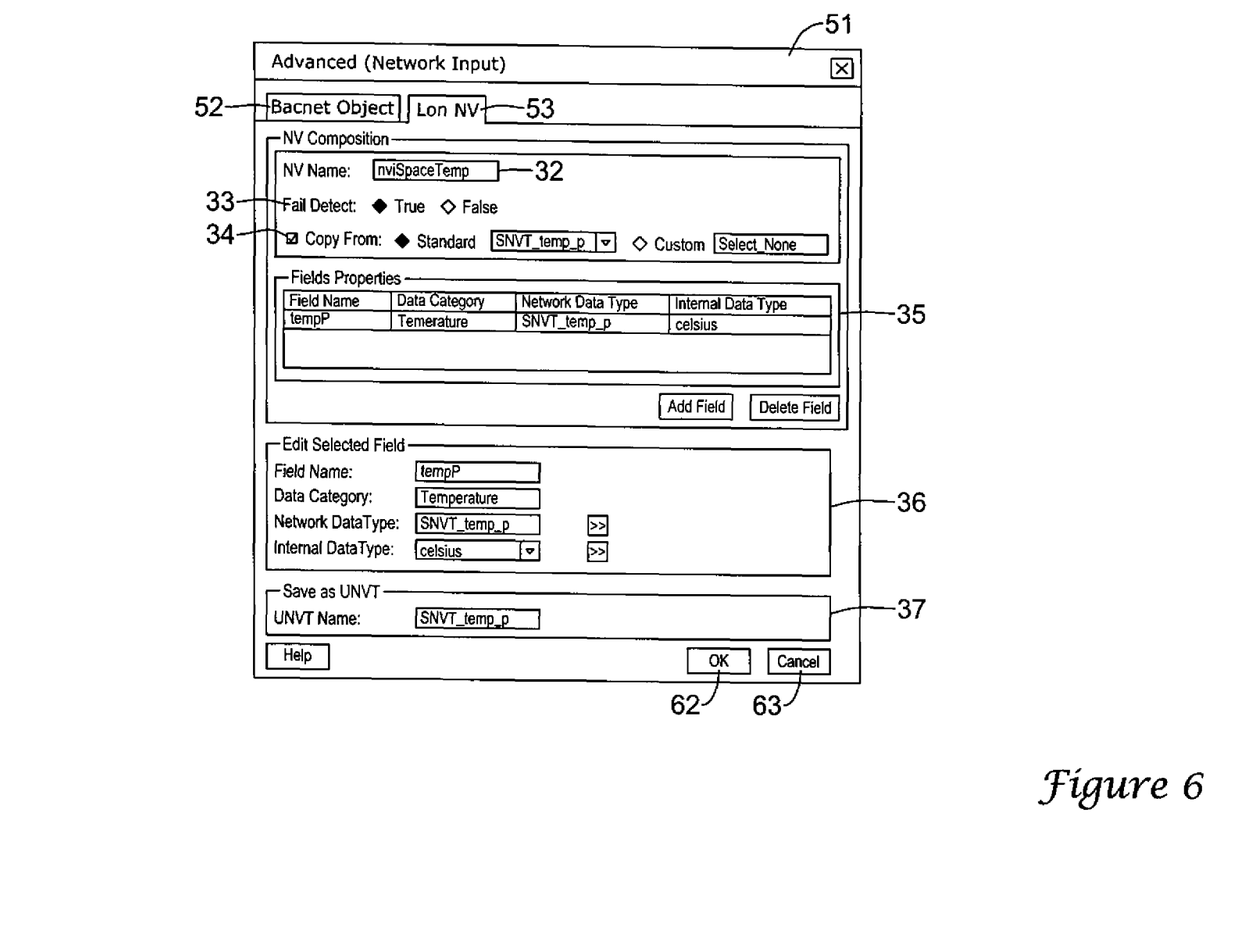
FIG. 6 is a diagram of a screen which may result from a click on the advanced button in the box of FIG. 4, and may be used relative to mapping details of another protocol for a data point object.

In FIG. 6, a Lon network variable appears as selected with tab or button 53. The NV composition may include NV name 32, fail detect indication 33, copy from standard or custom selection 34, field properties 35 which indicate field name, data category, network data type, and internal data type. A field may be added or deleted. There may be an edit field block 36 where field name, data category, network data type and internal data type may be edited. There may be a "Save as UNVT" block 37 with a space for a UNVT name. If the entries are acceptable, then the OK button 62 may be clicked or if not, then the cancel button 63 may be clicked.

The present abstraction and automatic mapping may allow the HVAC installer or programmer focus on the application domain and not be concerned about protocol details. This mechanism may allow adding support for virtually any number of communication protocols and also allow reuse of the same application programs.

A Spyder tool may offer a graphical environment to program the Spyder controller. One may use the wiresheet view in the engineering mode to use physical points, software points, and function blocks to build an application in the control program. The physical points, software points, and function blocks may be accessed using palette 48. One may drag these items on to the wiresheet and connect them, based on one's need, to develop application logic. The logic that one creates may then be stored in a Spyder library for reuse. Upon being satisfied with the logic one has created, one may download the same to the controller. The logic thus created may be tested for correctness using the simulation and online debugging modes.

One may note that changing NCI (network configuration input) values, configuration of a schedule block, or daylight savings option, puts the application in a quick download pending state. As long as the application has been downloaded at least once to the controller, these changes just trigger a quick download to the controller.

One may use the control program option to program the Spyder tool. To do this, one may expand Lon Spyder or BACnet Spyder in the Nav (navigation) palette 47 and double-click control program to display the wiresheet view; display the palette (from the menu bar, select Window>Sidebars>Palette to display the palette).

The palette may appear on the left pane with the following items. Lon Spyder is a device that one may drag on to the Lon network in the Nav palette 47 to create a new device. Note that one cannot drop this on to the wiresheet of any macro or control program or application. BACnet Spyder is a device that one may drag on to the BACnet network in the Nav palette 47 to create a new device. It may be noted that one cannot drop this on to the wiresheet of any macro or control program or application. Physical points may be modulating and binary inputs or outputs. Software points may be used to create a network input, network setpoints, or a network output.

Additional items may include analog function blocks, logic function blocks, math function blocks, control function blocks, data-function function blocks, zone arbitration function blocks, and built-in function blocks.

It may be noted that a macro may be a group of functional blocks grouped together that define a specific functionality. Commonly used program elements may be defined as macros so that they could be reused across applications. An application may include macros and logic that one can define and use in applications. Standard applications may be provided for the Spyder used to build application logic One may drag any of these noted items on to the wiresheet of a control program in its engineering mode and make the connections between physical points, software points, and function blocks to create a control program or an application.

A wiresheet view may be used to drag the physical points and function blocks to build the application logic. One may save a logic created to be used later and also shared with other users. One may build several applications and store them in a Spyder library along with standard applications.

After one has created the application logic and tested the logic using the simulation feature, the application logic may be downloaded to the controller. To download the application logic, one may: 1) on the Nav palette, right-click the device and select Actions>Download (the download dialog box may appear); and 2) select True under full download for a full download or false for a quick download. One may note that a quick download just downloads the modified items from a previous download where as with a full download the entire configuration may be downloaded to the controller replacing the existing configuration. However, if changes have been made to the SBus (Sylk or sensor bus) wall module by an operator/tenant locally from the display on the wall module, and a full download is performed, the Spyder tool may download the entire configuration to the controller except the SBus wall module configuration. This may be done to avoid losing any changes made locally on the SBus wall module during a download operation. Then at 3), one may click OK. The application logic may be downloaded to the controller based on one's selection.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A protocol independent programming tool for programming a heating, ventilation, and air conditioning (HVAC) controller comprising:
an HVAC controller;
a display in communication with the HVAC controller, the display configured to display a workbench for dragging and dropping generic points from a palette and connecting the generic points to construct control logic on a wiresheet; and
wherein the generic points are data points corresponding to parameters for controlling an HVAC system and are automatically translated to protocol specific entities without user intervention and without displaying the protocol specific entities on the workbench; and
the generic points can be shown in terms of protocol specific entities on the workbench when selected to be viewed.

2. The tool of claim 1, wherein protocol specific entities are network variables of a control protocol.

3. The tool of claim 1, wherein protocol specific entities are objects of a building automation and control network protocol.

4. The tool of claim 1, wherein information about a protocol specific entity of a generic point can be shown on the workbench with a click on the generic point on the wiresheet.

5. The tool of claim 4, wherein the click on the generic point results in a dialog box having at least one configure properties item.

6. The tool of claim 5, wherein a click on the configure properties item results in a list of properties for the generic point.

7. The tool of claim 6, wherein the list of properties for the generic point comprises point name and point type.

8. The tool of claim 6 wherein certain properties on the list of properties for the generic point are editable.

9. The tool of claim 6, wherein an advanced item associated with the list of properties is clicked obtain a list of protocols in the tool.

10. The tool of claim 9, wherein information about a building automation and control network protocol is provided on the workbench upon selection of the building automation and control network protocol from the list of protocols.

11. The tool of claim 10, wherein the information comprises an object name, object instance and object type.

12. The tool of claim 9, wherein information about a control protocol is provided on the workbench upon selection of the control protocol from the list of protocols.

13. The tool of claim 12, wherein the information comprises a network variable name and field properties.

14. The tool of claim 1, further comprising a generic network-device-point model for representing information from the control logic in terms of the protocol.

15. A method for protocol independent programming of a heating, ventilation, and air conditioning (HVAC) controller comprising:
providing an HVAC controller and a display;
providing a workbench on the display;
dragging and dropping generic points corresponding to parameters for controlling an HVAC system onto the workbench for constructing control logic without seeing details of a protocol on the workbench; and
downloading the control logic to the (HVAC) controller;
wherein the generic points are abstractions of entities of the protocol and are automatically translated to protocol specific entities without user intervention.

16. The method of claim 15, wherein the generic points are automatically mapped or translated to entities of the protocol.

17. The method of claim 15, wherein the protocol may be of virtually any number of communication protocols.

18. The method of claim 15, wherein the generic points represent logical application level values.

19. The method of claim 18, wherein the logical application level values comprise space temperature, damper position, and the like.

20. A protocol independent programming tool for programming a heating, ventilation, and air conditioning (HVAC) controller comprising:
- an HVAC controller;
- a display in communication with the HVAC controller, the display configured to display a workbench for dragging and dropping generic points from a palette and connecting the generic points to construct control logic on a wiresheet; and
- wherein the generic points are data points representing logical application level values corresponding to control parameters of an HVAC system automatically translated to protocol specific entities without user intervention and without displaying the protocol specific entities on the workbench; and
- wherein properties of the data points and properties of the protocol specific entities are shown upon user actuation of a properties button.

* * * * *